United States Patent
Kobayashi et al.

(10) Patent No.: US 10,434,494 B2
(45) Date of Patent: Oct. 8, 2019

(54) FILTRATION MATERIAL FOR FILTERED VENTING, AND FILTERED VENTING DEVICE

(71) Applicant: Rasa Industries, Ltd., Tokyo (JP)

(72) Inventors: Toshiki Kobayashi, Tokyo (JP); Koji Endo, Tokyo (JP)

(73) Assignee: Rasa Industries, Ltd., Tokyo (JP)

( * ) Notice: Subject to any disclaimer, the term of this patent is extended or adjusted under 35 U.S.C. 154(b) by 141 days.

(21) Appl. No.: 15/551,730

(22) PCT Filed: Mar. 8, 2016

(86) PCT No.: PCT/JP2016/057064
§ 371 (c)(1),
(2) Date: Aug. 17, 2017

(87) PCT Pub. No.: WO2016/143764
PCT Pub. Date: Sep. 15, 2016

(65) Prior Publication Data
US 2018/0029007 A1    Feb. 1, 2018

(30) Foreign Application Priority Data
Mar. 12, 2015  (JP) .................. 2015-049399

(51) Int. Cl.
*B01D 53/04* (2006.01)
*B01J 20/18* (2006.01)
(Continued)

(52) U.S. Cl.
CPC ............ *B01J 20/183* (2013.01); *B01D 53/04* (2013.01); *B01D 53/0407* (2013.01);
(Continued)

(58) Field of Classification Search
CPC .... B01D 53/04; B01D 53/0407; B01D 53/68; B01D 2253/108; B01D 2257/202;
(Continued)

(56) References Cited

U.S. PATENT DOCUMENTS

| | | | |
|---|---|---|---|
| 3,033,642 A | 5/1962 | Bukata et al. | |
| 4,088,737 A | 5/1978 | Thomas et al. | |

(Continued)

FOREIGN PATENT DOCUMENTS

| | | |
|---|---|---|
| CN | 103081022 | 5/2013 |
| DE | 202012012866 | 3/2014 |

(Continued)

OTHER PUBLICATIONS

First Office Action issued for the Japanese patent Application No. 2017-505339 dated Nov. 14, 2017 along with machine translation thereof.

(Continued)

*Primary Examiner* — Frank M Lawrence, Jr.
(74) *Attorney, Agent, or Firm* — Renner, Otto, Boisselle & Sklar, LLP

(57) ABSTRACT

Provided are a filtration material for filtered venting and a filtered venting device that are more effective in adsorbing radioactive iodine than in the conventional art and are useful for addressing severe accidents. The filtration material for filtered venting comprises granulated zeolite L, wherein at least a portion of the ion exchange sites of the zeolite L are substituted with silver. Of the ion exchange sites, a constitution ratio (a/b) of ion exchange sites (a) substituted with silver to ion exchange sites (b) not substituted with silver is 25/75-55/45. The zeolite L has a silver content of 7-12 wt % on a dry weight basis.

5 Claims, 4 Drawing Sheets

(51) Int. Cl.
| | |
|---|---|
| *B01D 53/68* | (2006.01) |
| *C01B 39/22* | (2006.01) |
| *C01B 39/32* | (2006.01) |
| *G21C 9/004* | (2006.01) |
| *G21F 9/02* | (2006.01) |
| *B01J 20/30* | (2006.01) |
| *C01B 39/02* | (2006.01) |
| *C01B 39/46* | (2006.01) |
| *B01J 20/28* | (2006.01) |

(52) U.S. Cl.
CPC ............ *B01D 53/68* (2013.01); *B01J 20/186* (2013.01); *B01J 20/28052* (2013.01); *B01J 20/3085* (2013.01); *C01B 39/026* (2013.01); *C01B 39/22* (2013.01); *C01B 39/32* (2013.01); *C01B 39/46* (2013.01); *G21C 9/004* (2013.01); *G21F 9/02* (2013.01); *B01D 2253/108* (2013.01); *B01D 2257/202* (2013.01); *B01D 2257/2068* (2013.01)

(58) Field of Classification Search
CPC .......... B01D 2257/2068; C01B 39/183; C01B 39/186; C01B 39/28052; C01B 39/3085; B01J 20/183; B01J 20/186; B01J 20/28052; B01J 20/3085; G21C 9/004; G21F 9/02; G21Y 2002/10; G21Y 2004/10
USPC .......... 95/131; 96/132; 423/DIG. 28; 502/60
See application file for complete search history.

(56) References Cited

U.S. PATENT DOCUMENTS

| | | | |
|---|---|---|---|
| 4,735,786 A | 4/1988 | Inoue et al. | |
| 5,075,084 A | 12/1991 | Wilhelm et al. | |
| 6,380,428 B1 | 4/2002 | Kulprathipanja et al. | |
| 6,642,168 B1 * | 11/2003 | Latus | B01J 20/186 502/180 |
| 2007/0028770 A1 * | 2/2007 | Tyndall | A61L 9/16 95/116 |
| 2013/0068102 A1 * | 3/2013 | Mori | B01J 20/08 96/108 |
| 2013/0182812 A1 | 7/2013 | Eckardt et al. | |
| 2016/0247588 A1 | 8/2016 | Kobayashi et al. | |
| 2016/0361701 A1 * | 12/2016 | Yang | B01D 53/04 |

FOREIGN PATENT DOCUMENTS

| | | |
|---|---|---|
| EP | 0608057 | 5/1997 |
| EP | 2123614 A2 * | 5/2009 |
| JP | 5954946 A | 3/1984 |
| JP | 63256898 A | 10/1988 |
| JP | 7209488 A | 8/1995 |
| JP | 899033 A | 4/1996 |
| JP | 8099033 A | 4/1996 |
| RU | 2035975 | 5/1995 |
| RU | 2414280 | 3/2011 |

OTHER PUBLICATIONS

PCT/JP2016/057064; PCT International Search Report of the International Searching Authority dated May 16, 2016 and its English translation.
Official Action for Korean Patent Application No. 10-2017-7024824 dated Dec. 21, 2018 and its English translation. All references (or the US equivalent) cited in this KR Official Action previously have been in this U.S. application.
Official Action for Russian Patent Application No. 2017133616 dated Feb. 19, 2018 and its English translation.
Official Action for Canadian Patent Application No. 2,977,615 dated Jun. 21, 2018.
Extended European Search Report for European Patent Application No. 16761732.3 dated Oct. 18, 2018.
First Office Action for Taiwanese Patent Application No. 105107125 dated May 28, 2019 and its English translation.

* cited by examiner

[FIG.1]
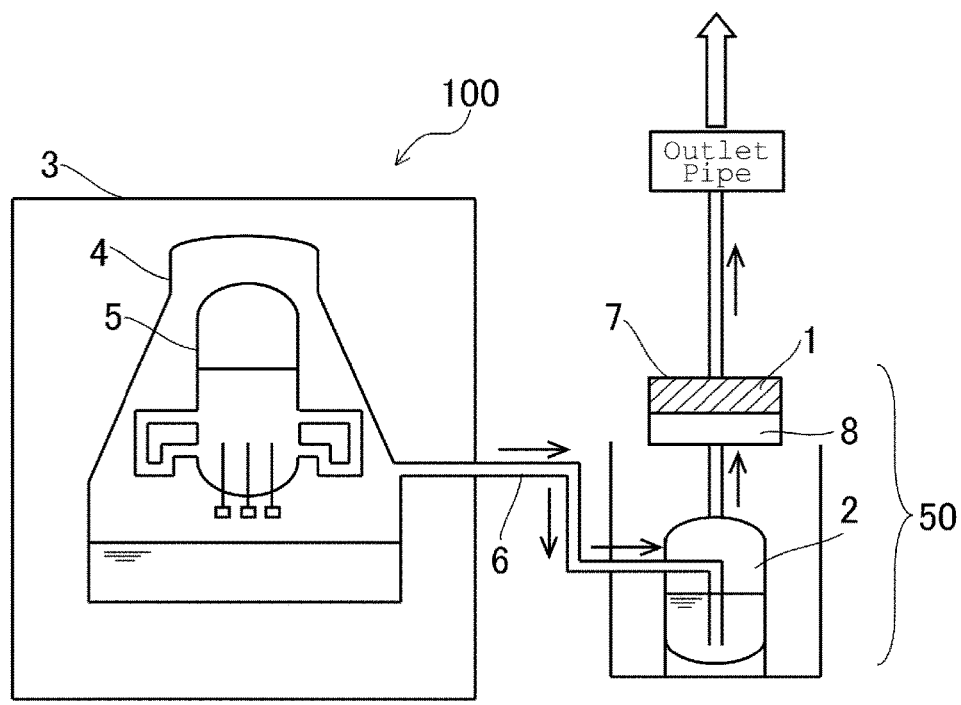

[FIG.2]
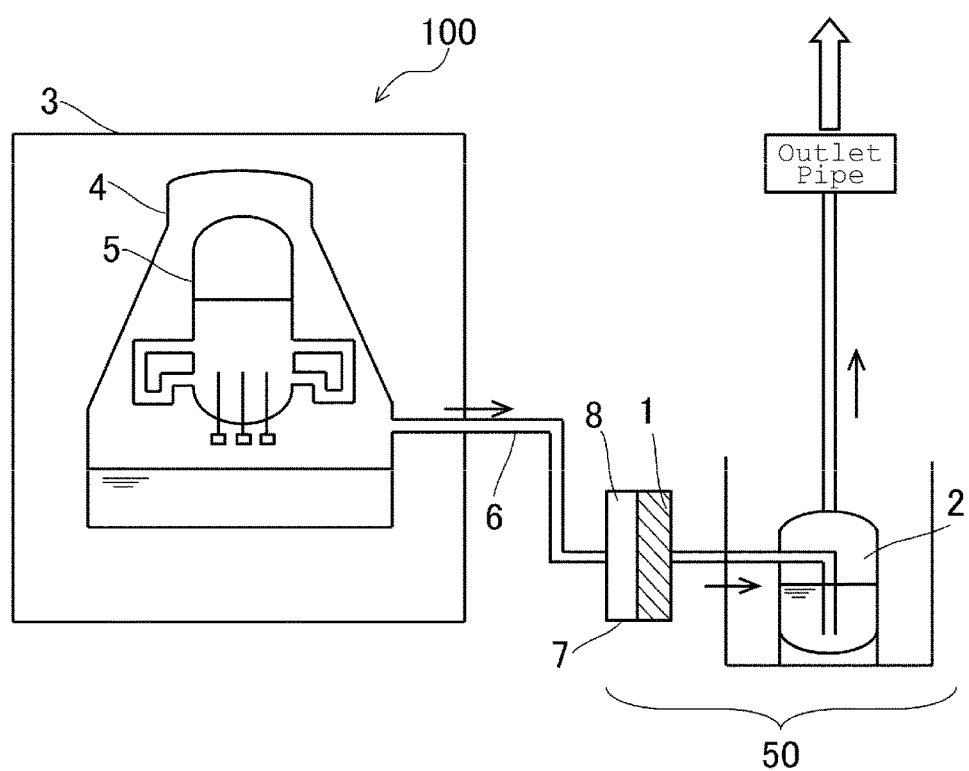

[FIG.3]
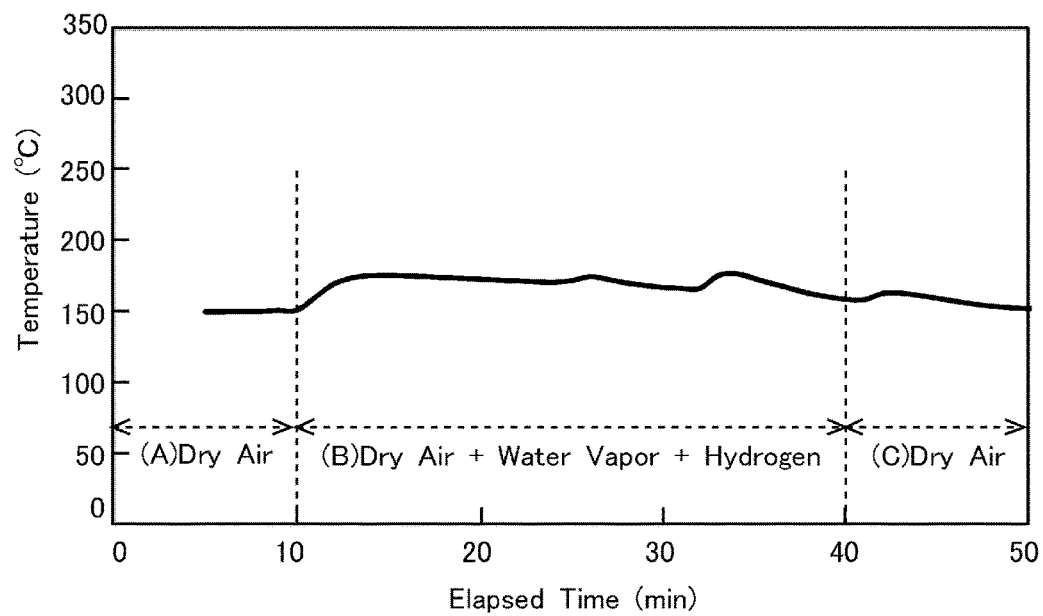

[FIG.4]
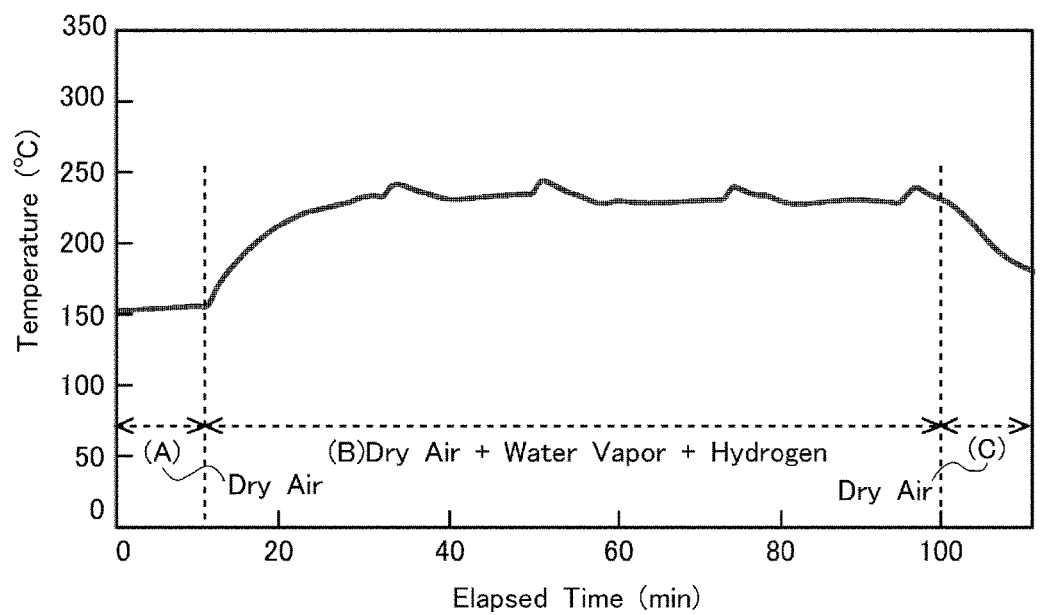

FILTRATION MATERIAL FOR FILTERED VENTING, AND FILTERED VENTING DEVICE

The present application is a U.S. National Stage Application based on and claiming benefit of and priority under 35 U.S.C. § 371 to International Application No. PCT/JP2016/057064, filed 8 Mar. 2016, which in turn claims benefit of and priority to Japanese Application No. 2015-049399, filed 12 Mar. 2015, the entirety of each of which is hereby incorporated herein by reference.

TECHNICAL FIELD

The present invention relates to a granulated filtration material (filler) for filtered venting which contains zeolite L, and a filtered venting device for treating radioactive iodine.

BACKGROUND ART

Nuclear power facilities, such as nuclear power plants and the like, are conventionally equipped with a filter for removing radioactive iodine. A flow of radioactive iodine-containing steam generated in a nuclear power facility is passed through the filter so that radioactive iodine is adsorbed and removed before being discharged from the nuclear power facility. This process is very important, and therefore, research and development efforts have been and are still being undertaken in order to improve the radioactive iodine adsorbing effect of the filter. Among such filters that have been developed are some radioactive iodine adsorbents made of zeolite. An example of those radioactive iodine adsorbents is one in which silver is supported on a zeolite having a silica-to-alumina molar ratio of 15 or more (see, for example, Patent Document 1). Patent Document 1 discloses such a radioactive iodine adsorbent that contains a reduced amount of silver supported on zeolite and can remove radioactive iodine with improved efficiency.

CITATION LIST

Patent Literature

Patent Document 1: Japanese Unexamined Patent Application Publication No. S60-225638

SUMMARY OF INVENTION

Technical Problem

In the adsorbent disclosed in Patent Document 1, the crystal structure of zeolite, which has such a pore size as to provide a molecular sieve effect, is utilized to selectively adsorb radioactive iodine. It is considered that the adsorbent disclosed in the document has a measure of success in adsorbing radioactive iodine. However, there is still a demand for higher-performance radioactive iodine adsorbents for reliably preventing leakage of radioactive iodine into the outside.

When an extraordinary situation (severe accident) such as a nuclear reactor accident or the like occurs in a nuclear power facility, a large amount of radioactive materials including radioactive iodine is released into a large area. Therefore, nuclear reactor accidents must be prevented from occurring. When a nuclear reactor accident occurs, countermeasures should be quickly taken. To this end, a plan to provide, to a nuclear reactor building, a filtered venting device for reducing pressure in a nuclear reactor when an extraordinary situation occurs in the nuclear reactor is under way. However, the radioactive iodine adsorbent disclosed in Patent Document 1 is not intended for addressing extraordinary situations where filtered venting or the like is required. Hydrogen generated in a nuclear reactor is considered to be a factor in nuclear reactor accidents. The reduction of such hydrogen is not at all described in Patent Document 1. Further research and development efforts are required to provide a radioactive iodine adsorbent that can be used even when an extraordinary situation occurs.

With the above problems in mind, the present invention has been made. It is an object of the present invention to provide a filtration material for filtered venting and a filtered venting device that are more effective in adsorbing radioactive iodine than in the conventional art and are useful for addressing severe accidents.

Solution to Problem

To achieve the above object, a filtration material for filtered venting according to the present invention is provided which comprises granulated zeolite L, wherein at least a portion of ion exchange sites of the zeolite L are substituted with silver.

There are a variety of zeolites, which have different crystal structures. Zeolites have a characteristic feature that each crystal structure has pores that are of considerably uniform size. Such characteristic pore sizes allow zeolites to be used for molecular sieves, selective adsorption of molecules, and the like. In the background art, zeolite X and zeolite Y have been mainly used as a base for filtration materials for filtered venting. Zeolite X and zeolite Y have the same crystal structure, and different numbers of alkali metal ions serving as ion exchange sites. The number of alkali metal ions is smaller in zeolite Y than in zeolite X, and therefore, the quantity of silver with which the alkali metal ions can be substituted is smaller in zeolite Y than in zeolite X. Therefore, zeolite Y has less radioactive iodine adsorptivity than that of zeolite X. The present inventors have studied zeolites that are not of X or Y type and have excellent radioactive iodine adsorptivity, and have focused on zeolite L. Zeolite L has approximately the same number of alkali metal ions as that of zeolite Y, and has a crystal structure different from that of zeolite Y. The present inventors have found that zeolite L, having such a characteristic structure, is also effective in adsorbing radioactive iodine. On the basis of this finding, the present inventors have developed a novel filtration material for filtered venting.

Such a filtration material for filtered venting comprises zeolite L in which a portion of the ion exchange sites (potassium sites) are substituted with silver (such a zeolite is herein referred to as "AgL zeolite"). AgL zeolite can adsorb radioactive iodine as silver iodide. Therefore, even when an extraordinary situation such as a nuclear reactor accident occurs, radioactive iodine can be prevented from being released from the nuclear reactor by the use of AgL zeolite.

In the filtration material for filtered venting of the present invention, of the ion exchange sites, a constitution ratio (a/b) of ion exchange sites (a) substituted with silver to ion exchange sites (b) not substituted with silver is preferably 25/75-55/45.

The present inventors have extensively studied the AgL zeolite having the above feature to find that the AgL zeolite in which the constitution ratio of ion exchange sites substituted with silver to ion exchange sites not substituted with silver is adjusted to the above value can effectively exert radioactive iodine adsorptivity. Here, the constitution ratio corresponds to the ratio (atomic ratio) of the number of silver atoms contained in the AgL zeolite to the number of metal atoms other than silver contained in the AgL zeolite. When an extraordinary situation (severe accident) such as a nuclear reactor accident occurs, it is important to quickly take countermeasures immediately after the occurrence of the accident so that radioactive iodine is prevented from being released into surrounding areas. If a filtration material for filtered venting including AgL zeolite having a constitution ratio (atomic ratio) adjusted within the above range is used, the filtration material can reliably adsorb radioactive iodine, and therefore, radioactive iodine can be prevented from being released from a nuclear reactor facility.

In the filtration material for filtered venting of the present invention, the zeolite L preferably has a silver content of 7-12 wt % on a dry weight basis.

In the filtration material for filtered venting having the above feature, the silver content is adjusted within the above range. Therefore, the filtration material for filtered venting has an excellent radioactive iodine adsorption effect.

In the filtration material for filtered venting of the present invention, the filtration material for filtered venting preferably has a thickness of two inches or more.

The filtration material for filtered venting having the above feature has a thickness of two inches or more. Therefore, for example, even when the temperature of steam containing radioactive iodine is less than 100° C. and the reactivity is reduced to some extent, the filtration material for filtered venting can reliably adsorb and remove radioactive iodine at a practical level.

In the filtration material for filtered venting of the present invention, the filtration material for filtered venting is preferably used at a temperature of 99° C. or more.

The filtration material for filtered venting having the above feature is used at a temperature of 99° C. or more. Therefore, even when the filtration material for filtered venting has a thickness of less than two inches, i.e., is relatively thin, the filtration material for filtered venting can reliably adsorb and remove radioactive iodine at a practical level.

To achieve the above object, a filtered venting device according to the present invention for continuously treating radioactive iodine is provided, wherein a silver-containing filtration material containing zeolite X, substantially all ion exchange sites of the zeolite X being substituted with silver, is provided upstream of the filtration material for filtered venting having any one of the above features.

A filtered venting device is placed outside a nuclear reactor, and therefore, AgL zeolite in the filtered venting device is normally at room temperature. In this situation, when a severe accident occurs, and high-temperature steam containing radioactive iodine and hydrogen flows into the filtered venting device, the steam is cooled and condenses into liquid water on the surface of the AgL zeolite. As a result, in the filtered venting device, the concentration of hydrogen and the concentration of oxygen relatively increase, leading to an increased risk of a hydrogen explosion.

To address this, the filtered venting device of the present invention is configured so that a silver-containing filtration material containing zeolite X substantially all the ion exchange sites of which are substituted with silver (the silver-containing filtration material is herein referred to as "AgX zeolite") is provided upstream of a filtration material for filtered venting including AgL zeolite. If the AgX zeolite and the AgL zeolite are thus arranged in series or in tandem (two-tier structure), most of high-temperature hydrogen-containing steam entering the filtered venting device condenses into liquid water in the AgX zeolite (first stage), i.e., most water is removed from the steam, resulting in substantially no condensation of the steam to liquid water in the AgL zeolite (second stage), so that a relative increase in hydrogen concentration and oxygen concentration can be avoided. In addition, the AgX zeolite (first stage) can satisfactorily adsorb hydrogen in addition to radioactive iodine, so that a relative increase in hydrogen concentration is inhibited. Therefore, the risk of a hydrogen explosion is reduced. The gas passing through the AgL zeolite (second stage) has an already reduced hydrogen concentration. Therefore, the filtered venting device having this feature is effective in reducing hydrogen and radioactive iodine from an early period of a severe accident. In addition, even when the treatment performance of the AgX zeolite (first stage) is reduced after a predetermined period of time has passed, the AgL zeolite (second stage) can adsorb radioactive iodine even in the presence of hydrogen substantially as effectively or efficiently as AgX zeolite does, and therefore, can address a severe accident over a long period of time. Thus, if, in the filtered venting device, the AgX zeolite and the AgL zeolite are arranged in series or in tandem (two-tier structure), an increase in hydrogen concentration can be inhibited in the filtered venting device, and radioactive iodine can be reliably prevented from being released into surrounding areas, resulting in a further improvement in safety.

BRIEF DESCRIPTION OF DRAWINGS

FIG. 1 is a diagram schematically showing a configuration of a boiling water reactor comprising a filtered venting device according to a first embodiment of the present invention.

FIG. 2 is a diagram schematically showing a configuration of a boiling water reactor comprising a filtered venting device according to a second embodiment of the present invention.

FIG. 3 is a graph showing changes in temperature as measured when a hydrogen-containing gas was passed through AgL zeolite as a filtration material for filtered venting of Example 1.

FIG. 4 is a graph showing changes in temperature as measured when a hydrogen-containing gas was passed through AgX zeolite.

DESCRIPTION OF EMBODIMENTS

Embodiments of a filtration material for filtered venting and a filtered venting device according to the present invention will now be described with reference to FIGS. 1-4. Note that the present invention is not intended to be limited to configurations described below.

As described above, when a severe accident occurs in a nuclear reactor facility, there is a high risk that radioactive iodine is released into surrounding areas, and a hydrogen explosion occurs. Therefore, to prepare severe accidents, a plan to provide, to nuclear reactor buildings, a filtered venting device for reducing pressure in the nuclear reactor is under way. The present inventors has conceived that radioactive iodine release and hydrogen explosions can be reliably prevented using a filtered venting device that is provided with zeolite L having ion exchange sites substituted with only silver, or silver and a metal other than silver (one selected from the group consisting of lead, nickel, and copper), as a filtration material for filtered venting.

<AgL Zeolite>

Firstly, zeolite L will be described, which is a base for the filtration material for filtered venting of the present invention. Zeolites, which are a type of silicate, have $(SiO_4)^{4-}$ and $(AlO_4)^{5-}$, having a tetrahedron structure, as repeating units, which are three-dimensionally linked one after another to form a crystal structure. The repeating units are linked in different ways to form different crystal structures. Each crystal structure formed has a specific uniform pore size. The uniform pore size allows zeolites to have properties such as molecular sieve, adsorption, and ion exchange capability. The filtration material for filtered venting of the present invention employs zeolite L, which is a type of zeolite. Zeolite L is, for example, used as a molecular sieve to separate normal paraffins ($C_1$-$C_7$). The filtration material for filtered venting of the present invention is formulated by substituting at least a portion of the potassium sites of zeolite L, which are an ion exchange site, with silver. Such a filtration material for filtered venting is hereinafter referred to as "AgL zeolite."

AgL zeolite has excellent radioactive iodine adsorptivity similar to that of conventional AgX zeolite. The filtration material for filtered venting of the present invention utilizes such a capability to prevent radioactive iodine from being released from a nuclear reactor facility. The amount of silver with which ion exchange sites can be substituted is small in AgL zeolite, compared to conventional AgX zeolite and zeolite Y, as described in greater detail below. Because silver is a high-cost metal, the use of AgL zeolite in the filtration material for filtered venting can reduce the amount of silver, which is advantageous in terms of cost.

As described above, AgL zeolite is formulated by substitution with silver. In the AgL zeolite of the present invention, the ion exchange sites may be substituted not only with only silver but also with silver and a metal other than silver. Specifically, AgL zeolite may be formulated by substituting a portion of the ion exchange sites of zeolite L with silver, and the balance with at least one selected from the group consisting of lead, nickel, and copper. These metals cost less than silver. If AgL zeolite is formulated as described above and is used as a filtration material for filtered venting, the amount of silver can be reduced, which is advantageous in terms of cost.

The AgL zeolite of the present invention is formulated in such a manner that the constitution ratio (a/b) of ion exchange sites (a) substituted with silver to ion exchange sites (b) not substituted with silver, of the ion exchange sites of zeolite L is adjusted within the range of 25/75-55/45, preferably the range of 25/75-45/55. As used herein, an ion exchange site not substituted with silver means a potassium site or a site that is substituted with a metal other than silver. The constitution ratio corresponds to the ratio (atomic ratio) of the number of silver atoms contained in AgL zeolite to the sum of the number of potassium atoms and the number of metal atoms other than silver contained in AgL zeolite. If the constitution ratio (a/b) is smaller than 25/75, the number of ion exchange sites substituted with silver is insufficient, the radioactive iodine adsorption effect is insufficient. Meanwhile, it is difficult to adjust the constitution ratio (a/b) to more than 55/45, because after a certain proportion of the ion exchange sites have been substituted with silver, ion exchange with silver is less likely to occur at the rest of the ion exchange sites. Therefore, it is difficult to produce AgL zeolite having a very high silver content using the state-of-the-art technique. In addition, silver is a high-cost material as described above, and therefore, a very high silver content is disadvantageous in terms of cost. Therefore, if at least a portion of the ion exchange sites of zeolite L are substituted with only silver or with silver and a metal other than silver (one selected from the group consisting of lead, nickel, and copper) in such a manner as to achieve the abovementioned range, a filtration material for filtered venting that can stably adsorb radioactive iodine can be produced.

The filtration material for filtered venting (AgL zeolite) thus formulated has a silver content of 7-12 wt % on a dry weight basis. If the silver content is within such a range, the silver and the metal other than silver (one selected from the group consisting of lead, nickel, and copper) contained in the filtration material for filtered venting effectively exert their functions at ion exchange sites in a well-balanced manner, and thereby reliably avoiding the release of radioactive iodine while maintaining safety even when a severe accident occurs. Incidentally, AgX zeolite has a silver content of approximately 39 wt % on a dry weight basis, and zeolite Y has a silver content of approximately 30 wt % on a dry weight basis. The silver content of 7-12 wt %, i.e., approximately 10 wt %, in AgL zeolite is approximately ¼ of that in AgX zeolite and approximately ⅓ of that in zeolite Y on a dry weight basis. Thus, the amount of silver required for AgL zeolite is smaller than those for AgX zeolite and zeolite Y. Therefore, the amount of silver can be significantly reduced, which is advantageous in terms of cost.

The filtration material for filtered venting is preferably obtained by shaping AgL zeolite into an appropriate shape, such as grains or pellets. In the case of grains, the grain size is adjusted to 4×100 mesh (JIS K 1474-4-6), preferably 10×20 mesh (JIS K 1474-4-6). As used herein, the term "mesh" expresses a grain size. For example, the term "10×20 mesh" means that grains having such a size can pass through a 10-mesh sieve, but not through a 20-mesh sieve, i.e., that the grain size is 10-20 mesh. In addition, the water content of the grain is adjusted in such a manner that the grain has a water content of 15 wt % or less, preferably 12 wt % or less, when dried at 150° C. for 3 hours and thereby reduced in weight.

In the case of pellets, the pellet length is adjusted to 6 mm or less, preferably 4 mm or less. The pellet diameter is adjusted to 2 mm or less, preferably 1.5 mm or less. The water content of the pellet can be adjusted within a range similar to that of the grain. The filtration material for filtered venting thus adjusted can more effectively exert the abovementioned excellent radioactive iodine adsorptivity.

Incidentally, filtration materials for filtered venting are exposed to a severe environment (high temperature, high pressure, high humidity), and therefore, are required to have a certain high strength (shape retention properties). With this in mind, the filtration material for filtered venting of the present invention is preferably adapted to have a loss on attrition of 10% or less (ASTM D-4058), preferably 5% or less (ASTM D-4058), and more preferably 3% or less (ASTM D-4058). As a result, even when the filtration material for filtered venting is placed under severe conditions such as filtered venting or the like, the filtration material for filtered venting can retain its shape, and therefore, continue to exert high radioactive iodine adsorptivity.

<AgX Zeolite>

In the filtered venting device of the present invention, AgX zeolite that is obtained by ion-exchanging substantially all the sodium sites of zeolite X with silver is provided upstream of the abovementioned AgL zeolite, as described in embodiments below. The zeolite X that is a base for AgX zeolite is preferably zeolite 13X. Zeolite 13X that is ion-exchanged with silver has a smaller pore size than that of the original zeolite 13X. Specifically, the pore size (approximately 0.4 nm) of zeolite 13X that has sodium sites before being ion-exchanged with silver is too great to capture a hydrogen molecule (molecular size: approximately 0.29 nm). Meanwhile, zeolite 13X, sodium sites of which have been ion-exchanged with silver, has an optimum pore size (approximately 0.29 nm) such that a hydrogen molecule fits into the pore. Thus, zeolite 13X ion-exchanged with silver can efficiently and effectively adsorb not only radioactive iodine but also hydrogen molecules.

<Filtered Venting Device>

First Embodiment

A filtered venting device according to the present invention that employs AgL zeolite and AgX zeolite formulated as described above will be described. FIG. 1 is a diagram schematically showing a configuration of a boiling water reactor 100 comprising a filtered venting device 50 according to a first embodiment of the present invention. As shown in FIG. 1, the boiling water reactor 100 includes the filtered venting device 50, a nuclear reactor building 3, a nuclear reactor containment building 4, and a nuclear reactor pressure vessel 5. The filtered venting device 50 comprises a filtration material 1 for filtered venting, and a filtered venting unit 2. The filtered venting unit 2 of this embodiment employs a scrubber-type wet venting system. The filtered venting device 50 is provided outside the nuclear reactor building 3, in case an accident occurs in the nuclear reactor, so that the nuclear reactor containment building 4 is damaged. When the nuclear reactor containment building 4 has an increased internal pressure, steam is transferred from the nuclear reactor containment building 4 to the filtered venting device 50 through a pipe 6 as indicated by a solid line arrow in FIG. 1. In the filtered venting device 50, radioactive iodine in the steam is captured by the filtered venting unit 2, and the steam is then passed through the filtration material 1 for filtered venting before being discharged into the outside through an outlet pipe.

As shown in FIG. 1, the filtration material 1 for filtered venting is accommodated in a container 7, which is coupled to the downstream side of the filtered venting unit 2. The container 7 is preferably made of a heat-resistant and corrosion-resistant material, because water vapor or gas generated in the nuclear reactor containment building 4 flows therethrough. Examples of such a material for the container 7 include stainless steel, titanium alloys, aluminum alloys, and the like. The container 7 is provided with a plurality of minute pores so that steam or gas is allowed to flow therethrough. The filtration material 1 for filtered venting is thus accommodated in the container 7, and therefore, can be easily handled. Here, it is desirable for workers to work as easily and quickly as possible in a nuclear reactor facility for the safety of the workers, to which a maximum level of attention should be paid. In this regard, this embodiment has a simple configuration in which the container 7 is filled with the filtration material 1 for filtered venting. Therefore, when the filtration material 1 for filtered venting is in need of replacement, the filtration material 1 for filtered venting is removed from the container 7 and replaced with a new one, i.e., only a simple work is required. This can reduce a load on workers and ensure their safety.

Incidentally, when a severe accident occurs, a large amount of hydrogen is generated in addition to radioactive iodine in a nuclear reactor facility, and these substances are contained in steam discharged from the nuclear reactor containment building 4. If hydrogen remains in the nuclear reactor facility, there is a risk that a hydrogen explosion occurs. Therefore, it is necessary to reliably treat hydrogen in addition to the treatment of radioactive iodine. AgL zeolite can adsorb radioactive iodine even in the presence of hydrogen. Therefore, it could be construed that if the container 7 filled with the filtration material 1 for filtered venting comprising AgL zeolite is provided downstream of the filtered venting unit 2 in the filtered venting device 50, radioactive iodine atoms are adsorbed by the AgL zeolite and removed from the steam one after another. However, the filtered venting unit 2 is placed outside the nuclear reactor building 3, and therefore, AgL zeolite (the filtration material 1 for filtered venting) in the container 7 provided downstream of the filtered venting unit 2 is normally at room temperature. In this situation, if high-temperature steam containing hydrogen flows into the filtered venting device 50, the steam entering the container 7 is cooled and condenses into liquid water on the surface of the filtration material 1 for filtered venting. As a result, in the filtered venting device 50, the concentration of hydrogen and the concentration of oxygen relatively increase, leading to an increased risk of a hydrogen explosion. Therefore, when the filtration material 1 for filtered venting is applied alone to the filtered venting device 50, the safety decreases in some situations, particularly during an early period of a severe accident.

With the above in mind, the present inventors have conceived of a filtered venting device having an optimum configuration for reliably removing hydrogen, which is highly explosive, in addition to radioactive iodine. As an example of such a configuration, in this embodiment, as shown in FIG. 1, a silver-containing filtration material 8 comprising AgX zeolite which is formulated by substituting substantially all the ion exchange sites of zeolite 13X with silver is provided upstream of the filtration material 1 for filtered venting comprising AgL zeolite according to the present invention. Thus, in the container 7, the silver-containing filtration material 8 (AgX zeolite) and the filtration material 1 for filtered venting (AgL zeolite) are thus arranged in series or in tandem (two-tier structure). Therefore, most of high-temperature hydrogen-containing steam entering the filtered venting device 50 condenses into liquid water in the silver-containing filtration material 8 (first stage), i.e., most water is removed from the steam, resulting in substantially no condensation of the steam to liquid water in the filtration material 1 for filtered venting (second stage), so that a relative increase in hydrogen concentration and oxygen concentration can be avoided. In addition, the silver-containing filtration material 8 (first stage) can satisfactorily adsorb hydrogen in addition to radioactive iodine, so that a relative increase in hydrogen concentration is inhibited. Therefore, the risk of a hydrogen explosion is reduced. The gas passing through the filtration material 1 for filtered venting (second stage) has an already reduced hydrogen concentration. Therefore, the filtered venting device of this embodiment is effective in reducing hydrogen and radioactive iodine from an early period of a severe accident. In addition, even when the treatment performance of the silver-containing filtration material 8 (first stage) is reduced after a predetermined period of time has passed, the filtration material 1 for filtered venting (second stage) can adsorb radioactive iodine even in the presence of hydrogen substantially as effectively or efficiently as AgX zeolite does, and therefore, can address a severe accident over a long period of time. Thus, in the filtered venting device 50, the filtered venting unit 2, the silver-containing filtration material 8, and the filtration material 1 for filtered venting are arranged in series, and share their functions, whereby hydrogen and radioactive iodine can be adsorbed highly efficiently and effectively. As a result, an increase in hydrogen concentration can be inhibited in the filtered venting device 50, and radioactive iodine can be reliably prevented from being released into surrounding areas, resulting in a further improvement in safety.

Second Embodiment

FIG. 2 is a diagram schematically showing a configuration of a boiling water reactor 100 comprising a filtered venting device 50 according to a second embodiment of the present invention. In the filtered venting device 50 of the first embodiment described above, the container 7 accommodating the filtration material 1 for filtered venting and the silver-containing filtration material 8 is located at a position that is not immediately adjacent to the nuclear reactor containment building 4, i.e., is located downstream of the filtered venting unit 2. In contrast to this, as shown in FIG. 2, in the filtered venting device 50 of the second embodiment, the container 7 accommodating the silver-containing filtration material 8 and the filtration material 1 for filtered venting is located at a position that is adjacent to the nuclear reactor containment building 4. In this case, steam discharged from the nuclear reactor containment building 4, which contains hydrogen in addition to radioactive iodine, is transferred to the filtered venting device 50 through a pipe 6 as indicated by a solid line arrow in FIG. 2. In the second embodiment, the steam passes through the silver-containing filtration material 8 and then the filtration material 1 for filtered venting in the container 7 before being treated by the filtered venting unit 2. When the filtered venting device 50 is thus configured, radioactive iodine is adsorbed and hydrogen is treated before the steam is transferred to the filtered venting unit 2, and therefore, the gas emitted from the container 7 accommodating the silver-containing filtration material 8 and the filtration material 1 for filtered venting has a reduced load, and therefore, can be smoothly treated by the filtered venting unit 2.

Other Embodiments

The first and second embodiments are both directed to a boiling water reactor. Alternatively, the filtration material 1 for filtered venting of the present invention is applicable to a pressurized water reactor. As in the case of a boiling water reactor, in order to take countermeasures when a nuclear reactor is damaged by a severe accident, a filtered venting device 50 in which a container 7 accommodating the filtration material 1 for filtered venting and the silver-containing filtration material 8 is coupled to the downstream side of a filtered venting unit 2 can be provided for a pressurized water reactor. Alternatively, in the filtered venting device 50, the container 7 accommodating the silver-containing filtration material 8 and the filtration material 1 for filtered venting may be provided at a position adjacent to a nuclear reactor containment building 4 for a pressurized water reactor (not shown). In addition, the filtration material 1 for filtered venting of the present invention is applicable to not only a wet venting system in which the filtered venting unit 2 described in each embodiment is of the scrubber type, but also a dry venting system combined with, for example, a metal fiber filter or a sand filter.

EXAMPLES

In order to verify properties of the filtration material for filtered venting of the present invention, various filtration materials for filtered venting (AgL zeolite) having different silver contents were prepared (Examples 1-5), and a change in temperature of each filtration material was measured when a hydrogen-containing gas was passed through the filtration material. As a reference example, AgX zeolite in which substantially all the ion exchange sites of zeolite 13X are substituted with silver was prepared (Reference Example 1), and a change in temperature of the filtration material was measured when a hydrogen-containing gas was passed through the filtration material in a manner similar to that in Examples.

<Formulation of Filtration Material for Filtered Venting>

Example 1

An appropriate amount of zeolite L was added to an aqueous nitrate solution adjusted to an appropriate silver concentration, and stirred for approximately one day at room temperature, for an ion exchange treatment. After the ion exchange treatment, the resultant zeolite L was separated by filtration, washed with pure water, and dried to obtain AgL zeolite. The AgL zeolite was dissolved by heating in a liquid mixture of hydrofluoric acid and nitric acid. Thereafter, the silver content of the AgL zeolite was analyzed using an ICP emission spectrometer (ICP emission spectrometer iCAP-6200 Duo, manufactured by Thermo Fisher Scientific Inc.). The analysis showed that the silver content of the AgL zeolite was 11.46 wt % on a dry weight basis. The amount of potassium remaining in the AgL zeolite was 5.73 wt % on a dry weight basis. The ratio (atomic ratio) of silver to potassium at the ion exchange sites of the AgL zeolite was 42/58.

Example 2

An appropriate amount of zeolite L was added to an aqueous nitrate solution adjusted to an appropriate silver concentration, and stirred for approximately one day at room temperature, for an ion exchange treatment. After the ion exchange treatment, the resultant zeolite L was separated by filtration, washed with pure water, and dried to obtain AgL zeolite. The AgL zeolite was dissolved by heating in a liquid mixture of hydrofluoric acid and nitric acid. Thereafter, the silver content of the AgL zeolite was analyzed using an ICP emission spectrometer (ICP emission spectrometer iCAP-6200 Duo, manufactured by Thermo Fisher Scientific Inc.). The analysis showed that the silver content of the AgL zeolite was 8.06 wt % on a dry weight basis. The amount of potassium remaining in the AgL zeolite was 7.45 wt % on a dry weight basis. The ratio (atomic ratio) of silver to potassium at the ion exchange sites of the AgL zeolite was 28/72.

Example 3

An appropriate amount of zeolite L was added to an aqueous nitrate solution adjusted to an appropriate silver concentration, and stirred for approximately one day at room temperature, for an ion exchange treatment. After the ion exchange treatment, the resultant zeolite L was separated by filtration, washed with pure water, and dried to obtain AgL zeolite. The AgL zeolite was dissolved by heating in a liquid mixture of hydrofluoric acid and nitric acid. Thereafter, the silver content of the AgL zeolite was analyzed using an ICP emission spectrometer (ICP emission spectrometer iCAP-6200 Duo, manufactured by Thermo Fisher Scientific Inc.). The analysis showed that the silver content of the AgL zeolite was 10.69 wt % on a dry weight basis. The amount of potassium remaining in the AgL zeolite was 6.05 wt % on a dry weight basis. The ratio (atomic ratio) of silver to potassium at the ion exchange sites of the AgL zeolite was 39/61.

Example 4

An appropriate amount of zeolite L was added to an aqueous nitrate solution adjusted to an appropriate silver concentration, and stirred for approximately one day at room temperature, for an ion exchange treatment. After the ion exchange treatment, the resultant zeolite L was separated by filtration, washed with pure water, and dried to obtain AgL zeolite. The AgL zeolite was dissolved by heating in a liquid mixture of hydrofluoric acid and nitric acid. Thereafter, the silver content of the AgL zeolite was analyzed using an ICP emission spectrometer (ICP emission spectrometer iCAP-6200 Duo, manufactured by Thermo Fisher Scientific Inc.). The analysis showed that the silver content of the AgL zeolite was 11.02 wt % on a dry weight basis. The amount of potassium remaining in the AgL zeolite was 5.83 wt % on a dry weight basis. The ratio (atomic ratio) of silver to potassium at the ion exchange sites of the AgL zeolite was 41/59.

Example 5

An appropriate amount of zeolite L was added to an aqueous nitrate solution adjusted to an appropriate silver concentration, and stirred for approximately one day at room temperature, for an ion exchange treatment. After the ion exchange treatment, the resultant zeolite L was separated by filtration, washed with pure water, and dried to obtain AgL zeolite. The AgL zeolite was dissolved by heating in a liquid mixture of hydrofluoric acid and nitric acid. Thereafter, the silver content of the AgL zeolite was analyzed using an ICP emission spectrometer (ICP emission spectrometer iCAP-6200 Duo, manufactured by Thermo Fisher Scientific Inc.). The analysis showed that the silver content of the AgL zeolite was 8.06 wt % on a dry weight basis. The amount of potassium remaining in the AgL zeolite was 6.10 wt % on a dry weight basis. The ratio (atomic ratio) of silver to potassium at the ion exchange sites of the AgL zeolite was 32/68.

Reference Example 1

Ninety-seven percent of the sodium sites of zeolite 13X were ion-exchanged with silver, followed by granulation such that the silver component accounted for 36 wt %, the grain size was 10×20 mesh (JIS K 1474-4-6), and the water content of the grain was 12 wt % when dried at 150° C. for 3 hours. Thus, AgX zeolite was obtained.

<Temperature Change Measurement Test>

Next, changes in temperature were measured when a hydrogen-containing gas was passed through the AgL zeolite formulated in Examples 1-5 and the AgX zeolite formulated in Reference Example 1. The test was conducted under the following conditions.

Examples 1-5

(A) Only dry air was passed through the AgL zeolite of each of Examples 1-5 heated at approximately 150° C., for 10 minutes from the start of the test, (B) a gas mixture of dry air, water vapor, and hydrogen was passed through the AgL zeolite between 10 minutes and 40 minutes after the start of the test, and (C) only dry air was passed through the AgL zeolite between 40 minutes and 50 minutes after the start of the test. FIG. 3 is a graph showing changes in temperature as measured when a hydrogen-containing gas was passed through the AgL zeolite of Example 1 as a representative of Examples 1-5.

Reference Example 1

(A) Only dry air was passed through the AgX zeolite of Reference Example 1 heated at approximately 150° C., for 10 minutes from the start of the test, (B) a gas mixture of dry air, water vapor, and hydrogen was passed through the AgX zeolite between 10 minutes and 100 minutes after the start of the test, and (C) only dry air was passed through the AgX zeolite from 100 minutes after the start of the test. FIG. 4 is a graph showing changes in temperature as measured when a hydrogen-containing gas was passed through the AgX zeolite of Reference Example 1.

The AgL zeolite of Example 1 as a filtration material for filtered venting was maintained at approximately 150° C. for the time period (A) for which only dry air was passed therethrough as shown in FIG. 3. For the time period (B), a gas mixture containing 85.5% by volume of dry air, 12.0% by volume of water vapor, and 2.5% by volume of hydrogen was passed through the AgL zeolite. For this time period, the contact time for which the gas mixture is in contact with the AgL zeolite was adjusted to 0.28 seconds. As a result, the temperature gradually increased between approximately 10 minutes and approximately 15 minutes after the start of the test, and was maintained at approximately 170° C. It can be inferred that the temperature increase is due to the heat of adsorption that occurs as the silver zeolite portions of AgL zeolite adsorb hydrogen, and the heat of some reaction between hydrogen and oxygen. Small changes in temperature occurred, but there was not a sharp change in temperature, between approximately 30 minutes and approximately 35 minutes after the start of the test, and thereafter, the temperature gradually decreased. For the time period (C), the temperature decreased to approximately 150° C., which is the same as the temperature at the start of the test.

The AgX zeolite of Reference Example 1 as a filtration material for filtered venting was maintained at approximately 150° C. for the time period (A) for which only dry air was passed therethrough as shown in FIG. 4. For the time period (B), a gas mixture containing 85.5% by volume of dry air, 11.0% by volume of water vapor, and 2.5% by volume of hydrogen was passed through the AgX zeolite. For this time period, the contact time for which the gas mixture is in contact with the AgX zeolite was adjusted to 0.28 seconds. As a result, the temperature started increasing at 10 minutes after the start of the test, and reached 250° C. at 30 minutes after the start of the test. It can be inferred that this temperature change is affected by the heat of adsorption that continuously occurs as the silver zeolite portions of AgX zeolite of Reference Example 1 adsorb hydrogen one after another, and the heat of reaction between hydrogen and oxygen, and the like. Thereafter, the temperature gradually decreased. For the time period (C), the temperature decreased to approximately 180° C., which is higher than 150° C. at the start of the test.

As described above, when a hydrogen-containing gas was passed through the AgL zeolite of Example 1 of the present invention, a significant change in temperature of the AgL zeolite was not observed. This suggests that, in the AgL zeolite of Example 1, the heat of adsorption of hydrogen and the heat of reaction between hydrogen and oxygen are low, i.e., the hydrogen adsorptivity is low. This result is true of the AgL zeolite of Examples 2-5.

In contrast to this, the temperature of the AgX zeolite of Reference Example 1 sharply increased when hydrogen and the like were passed therethrough, and gradually decreased after the end of passing hydrogen. This suggests that, in the AgX zeolite of Reference Example 1, the heat of adsorption of hydrogen is high, i.e., the hydrogen adsorptivity is high.

The above test results suggest that the AgL zeolite of the present invention has only small changes in temperature when a hydrogen-containing gas is passed therethrough, and therefore, there is not a risk that the AgL zeolite is overheated, leading to reduced safety.

<Adsorption Test>

Next, a test for adsorption of methyl iodide or iodine was conducted in order to verify the performance of the filtration material (AgL zeolite) for filtered venting of the present invention.

Examples 6-9

A test for adsorption of methyl iodide was conducted for AgL zeolite materials (Examples 6-9) having different silver contents that fall within the range specified in the present invention. Methyl iodide is a substitute for radioactive iodine that is generated when a severe accident occurs in a nuclear reactor facility. The ability of AgL zeolite to adsorb radioactive iodine can be predicted on the basis of the methyl iodide adsorption test. An air-permeable metal container (equivalent to the container 7 shown in FIG. 1) was filled with pellets of AgL zeolite each having a diameter of approximately 1 mm and a length of approximately 1-4 mm. Next, a gas (composition: 100 vol % of water vapor) containing methyl iodide and having a temperature of as high as 105° C. or 115° C. was passed through the metal container. The rate at which AgL zeolite adsorbs methyl iodide was calculated from the concentrations of methyl iodide contained in the gas as measured before and after the gas was passed through the metal container. Incidentally, the difference between the temperature of the high-temperature gas of 105° C. used in these examples and the dew point is 5 K (Kelvin, the same is true of the description that follows), and the difference between the temperature of the high-temperature gas of 115° C. used in these examples and the dew point is 15 K. The results of the methyl iodide adsorption test are shown in Table 1.

Example 10 demonstrated that the methyl iodide adsorption rate increases with an increase in the load thickness of the metal container. For the metal containers having the same load thickness, the adsorption rate was higher in the case of the high-temperature gas having the higher temperature.

Example 11

In Example 11 shown in Table 3, AgL zeolite having a silver content of 10.28 wt % and a potassium content of 6.42

TABLE 1

|  | Example 6 | | Example 7 | | Example 8 | | Example 9 | |
| --- | --- | --- | --- | --- | --- | --- | --- | --- |
| Silver Content (wt %) | 11.50 | | 9.00 | | 8.06 | | 8.04 | |
| Potassium Content (wt %) | 5.70 | | 6.40 | | 7.45 | | 7.36 | |
| Temperature (° C.) | 105 | 115 | 105 | 115 | 105 | 115 | 105 | 115 |
| Retention Time (sec) | 0.192 | 0.214 | 0.195 | 0.190 | 0.189 | 0.198 | 0.198 | 0.188 |
| Adsorption Rate (%) | 99.75 | >99.97 | 99.76 | 99.98 | 99.80 | >99.97 | 99.38 | 99.97 |

The AgL zeolite materials of Examples 6-9, where the high-temperature gas had a temperature of 105° C. and 115° C., had a methyl iodide adsorption rate of as high as 99% or more even though the contact time was as short as approximately 0.2 seconds or 0.2 seconds or less. Such an adsorption rate is comparable to that of AgX zeolite, which is known to have high radioactive iodine adsorptivity. It was also found that the methyl iodide adsorptivity of AgL zeolite does not significantly depend on the silver content, and is sufficient if the silver content falls within the range of the present invention.

Next, in order to support the practicability and objectivity of the filtration material for filtered venting of the present invention, a methyl iodide or iodine adsorption test was conducted by a third party, where water vapor containing radioactive iodine was actually passed through AgL zeolite. The results of the test are shown in Examples 10-15.

Example 10

In Example 10 shown in Table 2, AgL zeolite having a silver content of 11.02 wt % and a potassium content of 5.83 wt % was loaded into metal containers in such a manner that the loads of the AgL zeolite had different thicknesses (load thicknesses) within the range of 2-6 inches. A high-temperature gas of 104° C. or 109° C. containing methyl iodide ($CH_3^{131}I$) as radioactive iodine (composition: 95 vol % of water vapor+5 vol % of dry air, pressure: 98 kPa, the same is true of Examples 11-13 below) was passed through each sample container to calculate the methyl iodide adsorption rate. Incidentally, the difference between the temperature of the high-temperature gas of 104° C. used in this example and the dew point is 5 K, and the difference between the temperature of the high-temperature gas of 109° C. used in this example and the dew point is 10 K.

wt % was loaded into metal containers in such a manner that the loads of the AgL zeolite had different thicknesses (load thicknesses) within the range of 2-6 inches. A high-temperature gas of 99° C. containing methyl iodide ($CH_3^{131}I$) was passed through each sample container to calculate the methyl iodide adsorption rate. Incidentally, the difference between the temperature of the high-temperature gas of 99° C. used in this example and the dew point is 0 K.

TABLE 3

|  | Example 11 | | | | |
| --- | --- | --- | --- | --- | --- |
| Silver Content (wt %) | 10.28 | | | | |
| Potassium Content (wt %) | 6.42 | | | | |
| Thickness (in) | 2 | 3 | 4 | 5 | 6 |
| Retention Time (sec) | 0.16 | 0.24 | 0.32 | 0.4 | 0.48 |
| Temperature (° C.) | 99 | | | | |
| Adsorption Rate (%) | 97.05 | 99.30 | 99.78 | 99.942 | 99.9922 |

As with Example 10, Example 11 demonstrated that the methyl iodide adsorption rate increases with an increase in the load thickness of the metal container. It was also found that even when the high-temperature gas has a temperature of 100° C. or less, a practically useful methyl iodide adsorptivity is achieved, and when the thickness is 3 inches or more, a methyl iodide adsorptivity of as high as 99% or more is achieved.

Example 12

In Example 12 shown in Table 4, AgL zeolite having a silver content of 10.03 wt % and a potassium content of 5.97 wt % was loaded into metal containers in such a manner that the loads of the AgL zeolite had different thicknesses (load thicknesses) within the range of 2-6 inches. A high-tempera-

TABLE 2

|  | Example 10 | | | | | | | | | |
| --- | --- | --- | --- | --- | --- | --- | --- | --- | --- | --- |
| Silver Content (wt %) | 11.02 | | | | | | | | | |
| Potassium Content (wt %) | 5.83 | | | | | | | | | |
| Thickness (in) | 2 | | 3 | | 4 | | 5 | | 6 | |
| Retention Time (sec) | 0.16 | | 0.24 | | 0.32 | | 0.40 | | .48 | |
| Temperature (° C.) | 104 | 109 | 104 | 109 | 104 | 109 | 104 | 109 | 104 | 109 |
| Adsorption Rate (%) | 99.45 | 99.83 | 99.934 | 99.979 | 99.9935 | 99.9975 | 99.9991 | 99.9995 | 99.9999 | 99.9999 | ture gas of 99° C. or 101° C. containing methyl iodide (CH$_3$$^{131}$I) was passed through each sample container to calculate the methyl iodide adsorption rate. Incidentally, the difference between the temperature of the high-temperature gas of 99° C. used in this example and the dew point is 0 K, and the difference between the temperature of the high-temperature gas of 101° C. used in this example and the dew point is 2 K.

As with Examples 10-12, Example 13 demonstrated that the methyl iodide adsorption rate increases with an increase in the load thickness of the metal container. It was also found that even when the silver content is 9.00%, which is relatively small, a practically useful methyl iodide adsorptivity is achieved, and when the thickness is 3 inches or more, a methyl iodide adsorptivity of as high as 99% or more is achieved.

TABLE 4

| | Example 12 | | | | | | | | |
|---|---|---|---|---|---|---|---|---|---|
| Silver Content (wt %) | 10.03 | | | | | | | | |
| Potassium Content (wt %) | 5.97 | | | | | | | | |
| Thickness (in) | 2 | | 3 | | 4 | | 5 | | 6 |
| Retention Time (sec) | 0.16 | 0.16 | 0.25 | 0.23 | 0.33 | 0.31 | 0.41 | 0.39 | 0.49 | 0.46 |
| Temperature (° C.) | 99 | 101 | 99 | 101 | 99 | 101 | 99 | 101 | 99 | 101 |
| Adsorption Rate (%) | 97.68 | 99.21 | 99.54 | 99.899 | 99.924 | 99.985 | 99.988 | 99.9965 | 99.9986 | 99.9982 |

As with Examples 10 and 11, Example 12 demonstrated that the methyl iodide adsorption rate increases with an increase in the load thickness of the metal container. It was also found that even when the high-temperature gas has a temperature of 100° C. or less, a practically useful methyl iodide adsorptivity is achieved, and when the thickness is 3 inches or more or when the temperature is slightly higher than 100° C., a methyl iodide adsorptivity of as high as 99% or more is achieved.

Example 13

In Example 13 shown in Table 5, AgL zeolite having a silver content of 9.00 wt % and a potassium content of 6.58 wt % was loaded into metal containers in such a manner that the loads of the AgL zeolite had different thicknesses (load thicknesses) within the range of 2-6 inches. A high-temperature gas of 101° C. containing methyl iodide (CH$_3$$^{131}$I) was passed through each sample container to calculate the methyl iodide adsorption rate. Incidentally, the difference between the temperature of the high-temperature gas of 101° C. used in this example and the dew point is 2 K.

Example 14

In Example 14 shown in Table 6, AgL zeolite having a silver content of 11 wt % and a potassium content of 6 wt % was loaded into metal containers in such a manner that the loads of the AgL zeolite had different thicknesses (load thicknesses) within the range of 2-4 inches. A high-temperature gas of 110° C., 120° C., or 130° C. containing methyl iodide (CH$_3$$^{131}$I) was passed through each sample container at a linear speed of 24.4 m/min, at a pressure of 399 kPa and a relative humidity of 95%, i.e., under a wet condition (corresponding to the case where the temperature difference from the dew point is 2-3 K, the same is true of Example 15 below) to calculate the methyl iodide adsorption rate.

TABLE 6

| | Example 14 | | | | | | | | |
|---|---|---|---|---|---|---|---|---|---|
| Silver Content (wt %) | 11 | | | | | | | | |
| Potassium Content (wt %) | 6 | | | | | | | | |
| Thickness (in) | 2 | | | 3 | | | 4 | | |
| Retention Time (sec) | 0.208 | | | 0.312 | | | 0.416 | | |
| Temperature (° C.) | 110 | 120 | 130 | 110 | 120 | 130 | 110 | 120 | 130 |
| Adsorption Rate (%) | 99.569 | 99.351 | 98.998 | 99.994 | 99.944 | 99.912 | >99.999 | >99.999 | >99.999 |

Example 14 demonstrated that the methyl iodide adsorption rate increases with an increase in the load thickness of the metal container. It was also found that a methyl iodide adsorptivity of as high as 99% or more is achieved even under severe conditions that the pressure and the temperature are considerably high.

TABLE 5

| | Example 13 | | | | |
|---|---|---|---|---|---|
| Silver Content (wt %) | 9.00 | | | | |
| Potassium Content (wt %) | 6.58 | | | | |
| Thickness (in) | 2 | 3 | 4 | 5 | 6 |
| Retention Time (sec) | 0.16 | 0.24 | 0.32 | 0.4 | 0.48 |
| Temperature (° C.) | 101 | | | | |
| Adsorption Rate (%) | 98.26 | 99.61 | 99.88 | 99.979 | 99.9974 |

Example 15

In Example 15 shown in Table 7, AgL zeolite having a silver content of 11 wt % and a potassium content of 6 wt % was loaded into metal containers in such a manner that the loads of the AgL zeolite had different thicknesses (load thicknesses) within the range of 1-4 inches. A high-temperature gas of 110° C. or 130° C. containing iodine ($^{131}$I$_2$) as radioactive iodine was passed through each sample container at a linear speed of 24.4 m/min, at a relative humidity of 95%, i.e., under a wet condition to calculate the methyl iodide adsorption rate. The test in Example 15 was conducted to verify the iodine adsorptivity of AgL zeolite.

TABLE 7

| | Example 15 | | | | | | | |
|---|---|---|---|---|---|---|---|---|
| Silver Content (wt %) | 11 | | | | | | | |
| Potassium Content (wt %) | 6 | | | | | | | |
| Thickness (in) | 1 | | 2 | | 3 | | 4 | |
| Retention Time (sec) | 0.104 | | 0.208 | | 0.312 | | 0.416 | |
| Temperature (° C.) | 110 | 130 | 110 | 130 | 110 | 130 | 110 | 130 |
| Adsorption Rate (%) | 99.719 | 98.995 | 99.998 | >99.999 | >99.999 | >99.999 | >99.999 | >99.999 |

Example 15 demonstrated that the iodine adsorption rate increases with an increase in the load thickness of the metal container. Thus, it was found that the filtration material for filtered venting of the present invention has high adsorptivity with respect to not only methyl iodide but also elemental iodine. It was also demonstrated that the iodine adsorptivity is 99% or more even under sever conditions that the pressure and the temperature are considerably high, i.e., is considerably excellent.

Example 16

In Example 16 shown in Table 8, AgL zeolite having a silver content of 11 wt % and a potassium content of 6 wt % was loaded into a metal container in such a manner that the load of the AgL zeolite had a thickness (load thickness) of 2 inches. In order to replicate conditions during the start of filtered venting, a high-temperature gas of 120° C. containing methyl iodide ($CH_3I$) (composition: 53 vol % of water vapor+24 vol % of dry air+10 vol % of hydrogen+13 vol % of nitrogen) was passed through the sample container adjusted to 26° C. in such a manner that the retention time was 0.15 seconds, to calculate the temperature changes and the methyl iodide adsorption rate. The test in Example 16 was conducted to verify the methyl iodide adsorptivity of AgL zeolite in an atmosphere having a high hydrogen concentration. Incidentally, the difference between the temperature of the high-temperature gas of 120° C. used in this example and the dew point is 37 K.

TABLE 8

| | Example 16 | | | | |
|---|---|---|---|---|---|
| Silver Content (wt %) | 11 | | | | |
| Potassium Content (wt %) | 6 | | | | |
| Gas Passage Time (min) | 0~2 | 7~9 | 15~17 | 30~32 | 60~62 |
| Temperature (° C.) | 26~122 | 101~105 | 126 | 124 | 120 |
| Adsorption Rate (%) | 99.9 | >99.9 | >99.9 | >99.9 | >99.9 |

In Example 16, the methyl iodide adsorption rate reached 99.9% during an early period of the passage of the high-temperature gas. After that, the adsorption rate of as high as 99.9% or more was maintained. The temperature of the AgL zeolite was maintained at a temperature close to the temperature of the high-temperature gas, and was not overheated. From this phenomenon, it is inferred that the reactivity of AgL zeolite with hydrogen is low, and AgL zeolite can have a high methyl iodide adsorptivity even in an atmosphere having a high hydrogen concentration.

The abovementioned results of the temperature change measurement tests and the adsorption tests show that the AgL zeolite of the present invention serves as an excellent filtration material for filtered venting that has both safety and radioactive iodine adsorptivity in the presence of hydrogen. Therefore, a filtration material for filtered venting that contains the AgL zeolite of the present invention can be used alone to remove radioactive iodine to a safe level. When a filtration material for filtered venting that contains the AgL zeolite of the present invention is provided together with a silver-containing filtration material containing AgX zeolite in a filtered venting device, the upstream silver-containing filtration material (AgX zeolite) adsorbs most of hydrogen and radioactive iodine before the downstream filtration material for filtered venting (the AgL zeolite of the present invention) reliably adsorbs traces of radioactive iodine that have not been adsorbed by the upstream filtration material. Thus, the filtration material for filtered venting of the present invention and the filtered venting device of the present invention can inhibit an increase in hydrogen concentration in the filtered venting device while reliably preventing radioactive iodine from being released into surrounding areas, resulting in an improvement in safety.

INDUSTRIAL APPLICABILITY

The filtration material for filtered venting of the present invention and the filtered venting device of the present invention are typically used in nuclear power facilities, such as nuclear power plants or the like, and can also be used to ensure the safety of facilities (houses, shops, schools, etc.) located around the nuclear power facilities, and are also applicable to ships, research facilities, factories, and the like that are equipped with a nuclear reactor.

REFERENCE SIGNS LIST

1 FILTRATION MATERIAL FOR FILTERED VENTING (AgL ZEOLITE)
2 FILTERED VENTING UNIT
3 NUCLEAR REACTOR BUILDING
4 NUCLEAR REACTOR CONTAINMENT BUILDING
5 NUCLEAR REACTOR PRESSURE VESSEL
6 PIPE
7 CONTAINER
8 SILVER-CONTAINING FILTRATION MATERIAL (AgX ZEOLITE)
50 FILTERED VENTING DEVICE
100 BOILING WATER REACTOR

The invention claimed is:

1. A filtration material for filtered venting comprising granulated zeolite L for adsorbing radioactive iodine in the presence of hydrogen, wherein
   at least a portion of ion exchange sites of the zeolite L are substituted with silver, and of the ion exchange sites, a constitution ratio (a/b) of ion exchange sites (a) substituted with silver to ion exchange sites (b) not substituted with silver is 25/75-55/45, and
   the filtration material has a loss on attrition of 10% or less (ASTM D-4058).

2. The filtration material for filtered venting of claim 1, wherein the zeolite L has a silver content of 7-12 wt % on a dry weight basis.

3. The filtration material for filtered venting of claim 1, wherein
the filtration material for filtered venting has a thickness of two inches or more.

4. The filtration material for filtered venting of claim 1, wherein
the filtration material for filtered venting is used at a temperature of 99° C. or more.

5. A filtered venting device for continuously treating radioactive iodine, wherein
a silver-containing filtration material containing zeolite X, substantially all ion exchange sites of the zeolite X being substituted with silver, is provided upstream of a filtration material for filtered venting comprising granulated zeolite L, at least a portion of ion exchange sites of the zeolite L being substituted with silver.

* * * * *